G. SWEETLAND.

PULP MACHINE.

No. 1,108. Reissued Jan. 1, 1861.

Witnesses

Edwd Goodman Jr.

Sarah A Gray

Inventor

George Sweetland

THE NORRIS PETERS CO., PHOTO-LITHO., WASHINGTON, D. C.

UNITED STATES PATENT OFFICE.

GEORGE SWEETLAND, OF NEW HAVEN, CONNECTICUT, ASSIGNOR TO HENRY KENEY, GRANT, WARREN & CO., AND JOS. JORDAN, JR.

IMPROVEMENT IN PULP-MACHINES.

Specification forming part of Letters Patent No. 5,756 dated September 5, 1848; Reissue No. 1,108, dated January 1, 1861.

*To all whom it may concern:*

Be it known that I, GEORGE SWEETLAND, of the town of New Haven, in the State of Connecticut, have invented certain new and useful improvements in pulping-engines for grinding or preparing pulp from rags, straw, and other materials for making paper of every description; and I do hereby declare that the following is a full, clear, and exact description of the same, reference being had to the accompanying drawings, in which—

Figure 1:
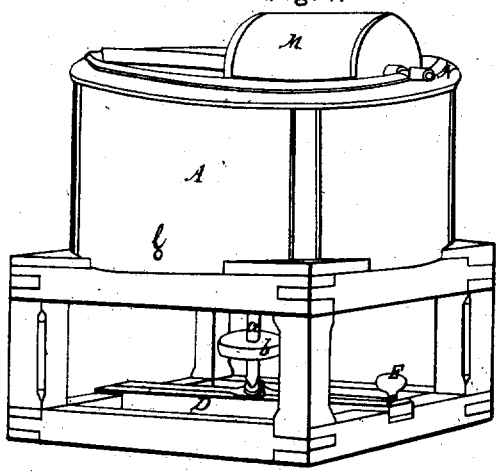
Figure 2:
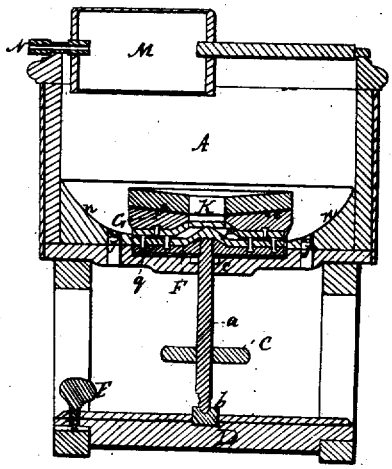
Figure 7:
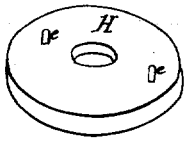
Figure 4:
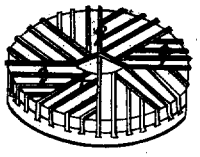
Figure 6:
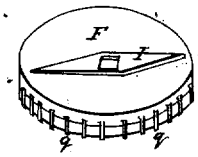
Figure 5:
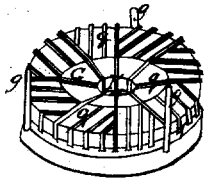
Figure 3:
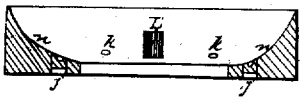

Figure 1 represents a perspective view of a pulping-engine constructed according to the principles of my invention. Fig. 2 represents a sectional view of the same cut vertically through the center of the shaft. Fig. 3 represents a side view of that half of the portion of the casing of the engine adjacent to the revolving worker, which is removed in Fig. 2. Figs. 4, 5, and 6 are perspective views of the knife-stocks, with their knives and filling; and Fig. 7 represents a perspective view of one of the additional weights or rims, to be used as hereinafter described.

In pulping-engines constructed previous to my invention a series of disintegrating-knives are arranged lengthwise upon the surface of a revolving cylinder, and are made to operate in combination with a concave, (formed of similar knives—that is applied to only a portion of the cylinder,) and with a casing, in such manner that the material to be ground passes crosswise to the knives and to the shaft of the cylinder of knives between a portion of the cylinder of knives and the concave. Such pulping-engines are defective because from the construction of the concave and of the casing which controls the direction in which the material passes through the engine but a small portion of the revolving cutting-surface of the cylinder is operating at any one time; hence, although this class of pulping-engines do the work of pulping effectually, they do it slowly.

The object of my invention is to expedite the process of pulping by remedying the defects of preceding pulping-engines so that the paper material may be reduced to the same fineness as is practicable with the old cylinder pulping-engines, but with much greater speed than is attainable by means of them, and that the speed of grinding may be maintained for a long period notwithstanding the wear by use.

To this end the first part of my invention consists in a combination, in a pulping-engine, of two series of disintegrating-knives or "cutters," as they are sometimes called, with two knife-stocks (between which the paper material is passed and one of which revolves) in such manner that the edges of the said knives diverge from the axis of rotation, so that the edges of the two series of knives can be set nearer to each other by moving one of the knife-stocks in the direction of its axis.

The second part of my invention consists in a combination, in a pulping-engine, of the following elements, viz: First, two knife-stocks, between which the paper material is caused to pass and one of which rotates on a central axis; second, two series of disintegrating-knives secured to the stocks; and, third, a feeding-passage to and an exit-passage from the knife-stocks, so arranged relatively to the disintegrating-knives that the paper material, in passing from one passage to the other, traverses lengthwise with the knives.

The third part of my invention consists in combining a series of diverging disintegrating-knives upon the knife-stocks of a pulping-engine with wood filling or its equivalent between the knives, which filling can be readily cut away, as found necessary to control the more or less rapid passage of the paper material lengthwise with the disintegrating-surfaces.

The fourth part of my invention consists in an arrangement of a series of knives upon the knife-stock of a pulping-engine in such manner that there are fewer knives near the entry-passage than at the part of the knife-stock farther therefrom.

The fifth part of my invention consists in combining a pair of knife-stocks having diverging disintegrating-knives thereon, with suitable entry and exit passages for the paper material, and with a casing so constructed that it returns the partially-ground pulp between the knife-stocks for the purpose of carrying the grinding of the pulp farther.

The sixth part of my invention consists in the combination of the revolving knife-stock of a pulping-engine with disintegrating-knives upon one side thereof, and with arms or their equivalents upon the opposite side thereof, to prevent the paper material from lodging between the knife-stock and the casing or vat in which it revolves.

The several parts of my invention are all embodied in the pulping-engine represented in the accompanying drawings, which exemplifies my invention.

In this example the knife-stocks F G have a disk or wheel form, and are formed of cast-iron. The two are arranged horizontally in the bottom of a vat or casing, A, and the lower revolves, while the other, G, does not. The former I term the worker and the latter the bed. The worker has a socket in it which fits upon a revolving shaft by which it is caused to rotate on its axis. The adjacent faces of each knife-stock are fitted with disintegrating-knives *q q*, or "cutters," as they are sometimes called, which diverge from the axes of the stocks. These cutters should be made of bars of steel of the proper shape and tempered, and inserted in dovetail slots, so that they may be easily inserted or removed and changed, should this be necessary in consequence of their being broken or wearing down too low to work well. As the cutters or knives grind against each other they are self-sharpeners, and they work better after they have become properly fitted to each other by using them some time than they will when new. The bed G has an eye, K, at the center, to form the entry-passage for the paper material to the disintegrating-knives, and the whole periphery of the knife-stocks is left unobstructed by the casing to form an exit passage for the paper material from the disintegrating-knives. As the knives in this example diverge from the axis of rotation, the direction of their length is in lines drawn from one of these passages to the other; hence the paper material in passing from the entry to the exit-passage traverses along the length of the knives. The passage of the paper material in the direction of the knives is of course modified by the revolution of the knives, which, in addition, carries it across their edges, so that the paper material describes spiral lines; but still the paper material traverses along the length of the knives in contradistinction to being merely made to travel across their edges, as is the case in the knife-cylinder pulping engines previously in use.

The knives when new project some distance from the faces of their stocks, and the spaces between them, if left open, would permit the paper material to pass between the knife-stocks so freely that it would not be properly ground by the knives. In order to prevent such a result the spaces between the knives are fitted in with wood, (or other material,) which can be readily cut away as the knives wear down, as found necessary, to control the more or less rapid passage of the paper material between the disintegrating-surfaces formed by the knives. The knives are not all of the same length, and they are arranged upon the knife-stocks in such manner that there are a fewer number of disintegrating-edges near the axis of rotation than at a distance therefrom, so that the draft of the engine is more open nearer the axis of rotation; or, in other words, the passage of the paper material is freer near the entry-passage than at the exit-passage, the difference being proportioned to the reduction of the material in fineness as the operation proceeds. This freedom of draft toward the entry-passage to the disintegrating-surfaces is furthered by making the face of the bed G diverge from the worker as it approaches the entry-passage, as shown at *p*, Fig. 5.

The worker F and the bed G are surrounded by a casing or vat, A, which prevents the escape of the water in which the paper material is ground from the latter until the two are drawn off together from suitable openings, *j j*, which are fitted with valves. As the present machine is intended to complete the grinding of the paper material by the same set of grinding-surfaces without intermission, the casing is constructed so as to form a vat with a circular curve, *n n*, at the bottom to direct the material from the exit-passage toward the entry-passage, and as the knife-stocks in this example are of a disk form, and one rotates on its axis, the centrifugal force generated by the rotation causes the paper material to ascend the sides of the vat, while the force of gravity causes it to descend in a column toward the entry-passage at the eye of the bed, so that the paper material is caused to pass in a circuit until it is sufficiently ground.

As the knife-stocks in the present machine are set horizontally in the casing, the rotating shaft *a*, which imparts motion to the worker F, is vertical. It passes through a suitable packing-box, *c*, in the casing, and its outer end is supported by a box, *b*, in a bridge-tree, D, that can be raised or depressed by means of a screw, E, to adjust the position of the worker F to the bed G. This shaft is fitted with a belt-pulley, C, to which power is applied by means of a belt.

The casing or vat A is supported by a suitable frame. Its bottom has a hallow space or socket in it, covered by a grating L, to form a sand-trap, which receives sand or other small and heavy substance that happens to be mixed with the paper material. This sand-trap communicates by means of a passage with an orifice in the exterior of the casing, which is fitted with a valve or gate, *l*, by which the sand, &c., collected may be permitted to escape. In order that the space between the under face of the worker and the casing may not become clogged by an accumulation of paper material or foreign matter mixed therewith, I combine with the worker a bar, I, Fig. 6, which I term the "banger," and whose arms, revolving with the worker, prevent any material from lodging between it and the casing.

A provision is made in the present engine to permit the disintegrating-knives on the two knife-stocks to separate when the material tends from its coarseness or from other reasons to choke the engine. In order to permit this separation the bed G is not secured in an invariable position, but is sustained by three supports, *g g g*, which are received in sockets or spaces *k* in the circular curve *n n*. This mode of support prevents the upper knife stock or bed from turning with the lower, but permits it to move from the lower should too much material be carried in at any time between the two, or should any improper substance get into the engine with the material to be ground. It also permits the bed to be readily removed for repairs, &c. As the retention of this movable knife-stock in its position in reference to the other knife-stock is due in this engine to the weight of the movable knife-stock, additions may be made to it (should it be found too light at any time) by cast-iron rims, like H, Figs. 2 and 7, having a hole or eye, K, Fig. 7, through the center of the same size and shape as that in the bed. These rims should be held in their proper positions by steady-pins *e e*, Figs. 2 and 7; or, for convenience, the bed may be made of light weight, and any number of these rims may be made of a convenient weight to handle, and be placed one upon another on the bed until there is sufficient weight to insure the grinding of the paper material, thereby rendering the bed more convenient to handle when necessary to be taken up for repairs, &c.

Phelps's patent cylindrical rag-washer may be used in connection with a pulping-engine constructed as herein described by attaching it as represented in the drawings at M, Figs. 1 and 2, N representing the hollow gudgeon or pivot through which the water is let off, or any other washer may be used, as deemed most convenient in any case.

The most important features of my pulping-engine are the construction and combination of the parts in such manner that the paper material traverses along the length of the disintegrating-knives, and the control of the passage of the paper material by a filling between the knives of such character that it can be cut away as required to regulate this lengthwise passage. From the former it results that the whole of the disintegrating-knives may be acting simultaneously, and from the latter that the speed of the grinding is under the control of the workman, who, by cutting away the filling as the knives wear down, can keep the speed of the passage of the paper material the same although the knives wear down.

Having thus described a pulping-engine embodying all parts of my invention, I do not claim the stationary bed, nor the revolving worker, nor the disintegrating-knives, nor the manner of inserting them in the wheels, when considered separately from the parts with which they are combined by me; but

What I claim as my invention in pulping-engines, and desire to secure by Letters Patent, is—

1. The combination, in a pulping-engine, of two series of disintegrating-knives with two knife-stocks, between which the paper material is passed and one of which revolves, in such manner that the edges of the knives diverge from the axis of rotation, substantially as described.

2. The combination of the following elements in a pulping-engine, viz: first, two knife-stocks, between which the paper material is caused to pass, and one of which revolves on a central axis; second, two series of disentegrating-knives secured to the stocks; third, a feeding or entry passage to and an exit-passage from the knive-stocks, so arranged relatively to the disintegrating-knives that the paper material in passing from one passage to the other traverses lengthwise with the knives, substantially as described.

3. The combination of a series of diverging disintegrating-knifes upon the knife-stock of a pulping-engine, with filling between the knives which can be cut away as found necessary to control the more or less rapid passage of the paper material lengthwise with the disintegrating-surfaces, substantially as described.

4. Arranging a series of disintegrating-knives upon the knife-stock of a pulping-engine in such manner that there are fewer knives near the entry-passage than at the part of the knife-stock farther therefrom, substantially as described.

5. The combination, in a pulping-engine, of the following elements, viz: a pair of knife-stocks having diverging disintegrating-knives thereon, suitable entry and exit passages for the paper material, and a casing so constructed that it returns the partially-ground pulp between the knife-stocks for the purpose of grinding the pulp further, substantially as described.

6. The combination, in a pulping-engine, of the following elements, viz: a revolving-knife-stock, a series of disintegrating-knives upon one side thereof, and arms upon the opposite side thereof, substantially as described.

In testimony whereof I have hereunto subscribed my name.

GEORGE SWEETLAND.

Witnesses:

EDWD. GOODWIN, JR.,
SARAH A. GROVES.